United States Patent [19]

Fanz

[11] 4,276,501
[45] Jun. 30, 1981

[54] DEVICE FOR CLEANING AND DEFOGGING, ESPECIALLY FOR THE REAR WINDOW OF AN AUTOMOBILE

[75] Inventor: Helmut Fanz, Asnieres, France

[73] Assignee: Regie Nationale des Usines Renault, Boulogne-Billancourt, France

[21] Appl. No.: 853,741

[22] Filed: Nov. 21, 1977

[30] Foreign Application Priority Data

Nov. 19, 1976 [FR] France ............... 76 35036

[51] Int. Cl.³ .............................................. H02P 3/00
[52] U.S. Cl. .................... 318/470; 318/443; 15/250.05; 15/250.17
[58] Field of Search ............... 15/250.05, 250.12; 318/443, DIG. 2, 466–468, 470

[56] References Cited

U.S. PATENT DOCUMENTS

| | | | |
|---|---|---|---|
| 2,407,215 | 9/1946 | Anderson | 15/250.12 |
| 2,987,747 | 6/1961 | Oishei et al. | 15/250.12 |
| 3,146,482 | 9/1964 | Wood | 15/250.17 |
| 3,564,375 | 2/1971 | Allaria | 15/250.12 |
| 3,569,812 | 3/1971 | Bates | 15/250.12 |
| 3,718,940 | 3/1973 | Bode | 15/250.06 |
| 3,902,217 | 9/1975 | Bötz et al. | 15/250.12 |
| 4,123,694 | 10/1978 | Andrei-Alexandru et al. | 318/466 |

FOREIGN PATENT DOCUMENTS 1101441 1/1968 United Kingdom .
1321221 6/1973 United Kingdom .

Primary Examiner—Gene Z. Rubinson
Assistant Examiner—Eugene S. Indyk
Attorney, Agent, or Firm—Oblon, Fisher, Spivak, McClelland & Maier

[57] ABSTRACT

A window clearing arrangement particularly for the rear window mounted on an automobile liftgate is provided, being characterized by a control circuit comprising a single relay, the single reversing contact of which enables, according to its position, either wiping by powering the motor-reducer or the stopping of the motor by short-circuiting of the armature. The relay is fed by the first wire, while the second wire powers the defogging system. All of the controls, whether momentary or not, involve one or more suitable switches, one position, however, being reserved for the impulse control of the washer by electrically powering a pump, which simultaneously activates the wiper.

10 Claims, 3 Drawing Figures

DEVICE FOR CLEANING AND DEFOGGING, ESPECIALLY FOR THE REAR WINDOW OF AN AUTOMOBILE

BACKGROUND OF THE INVENTION

1. Field of the Invention

The present invention relates to an arrangement for clearing automobile windows and more particularly to a simple and complete arrangement for wiping, washing and defogging, especially the rear window mounted on a liftgate.

2. Description of the Prior Art

A method is known of wiping and washing the rear window of an automobile with a wiper motor-reducer assembly and a pump actuated by a momentary or permanent action switch located on the dash. French patent application No. 75/15 319 in the name of the present applicant actually describes a wiper motor-reducer controlled by momentary commands, associated with a means of prolonging the operation of the wiper until it reaches its rest position by the short-circuiting of the motor armature by means of a reverser controlled by the reducer output.

This simple control, nevertheless, requires the installation of three wires, the difficulty consisting in passing the wires from the front to the rear of the vehicle, then ensuring electrical continuity going from the body to the liftgate carrying the wiper-washer assembly.

A known solution is to connect the two wires supplying power to the ends of two current-carrying liftgate equilibrators.

It was necessary, then, to develop a wiper-washer arrangement able to operate entirely from two power leads in order to benefit from the connection through the liftgate equilibrators.

A modification of the object of the above mentioned application No. 75/15 319 eliminates one control wire, thanks to the introduction of a supplementary resupply diode or by replacing the reverser for prolonged operation with a more costly fast-break model, but it must be pointed out that only the wiper is concerned here.

It is known on the other hand how to supply, with just two wires, the system for defogging the rear window by electrical heating, but this solution again is incomplete.

Finally, there are sophisticated arrangements permitting two-wire control of the wiper and the defogger, but at the cost of a complex electronic circuit involving several relays, at least one of which is a delay relay, as well as other electronic components.

SUMMARY OF THE INVENTION

The object of the present invention is to avoid the foregoing drawbacks and to provide a complete wiper-washer-defogger arrangement powered and controlled by two wires from the front of the vehicle by actions, momentary or not, and by the intermediary of a very simple and inexpensive electric control circuit.

To this end, the invention is characterized by a control circuit comprising a single relay, the single reversing contact of which enables, according to its position, either wiping by powering the motor-reducer or the stopping of the motor by short-circuiting of the armature. The relay is fed by the first wire, while the second wire powers the defogging system.

Several arrangements are possible. In a first preferred embodiment, the first wire is used for completely stopping the wiper (relay excited) and the second wire both for permanent defogging and for momentary wiping action (relay unexcited). In a second embodiment, the first wire is used for permanent wiping (relay excited) and the second wire both for permanent defogging and for stopping the wiper (relay unexcited) by momentary action. All the controls, momentary or not, involve one or more suitable switches, one position, however, being reserved for the impulse control of the washer by electrically powering a pump, simultaneously activating the wiper.

Besides the savings in wire realized in the vehicle electrical installation the two-wire feed facilitates the passage of these wires from the dash where the control switches are grouped and permits advantageous use of the conducting paths through the liftgate equilibrators. On the other hand, the connection through the equilibrators is particularly suited to the case in which the arrangement of the invention, not furnished with the vehicle, could be rapidly installed as an option. To facilitate installation further, the control circuit is in convenient monobloc form, comprising the wiper motor-reducer with its reverser for prolonged operation, the relay, a protective thermal cutout and possibly printed-circuit wiring.

BRIEF DESCRIPTION OF THE DRAWINGS

Other advantages and features of the invention will appear from the following descriptions of two embodiments thereof with reference being made to the attached drawings in which.

DETAILED DESCRIPTION OF THE PREFERRED EMBODIMENTS

Figure 1:
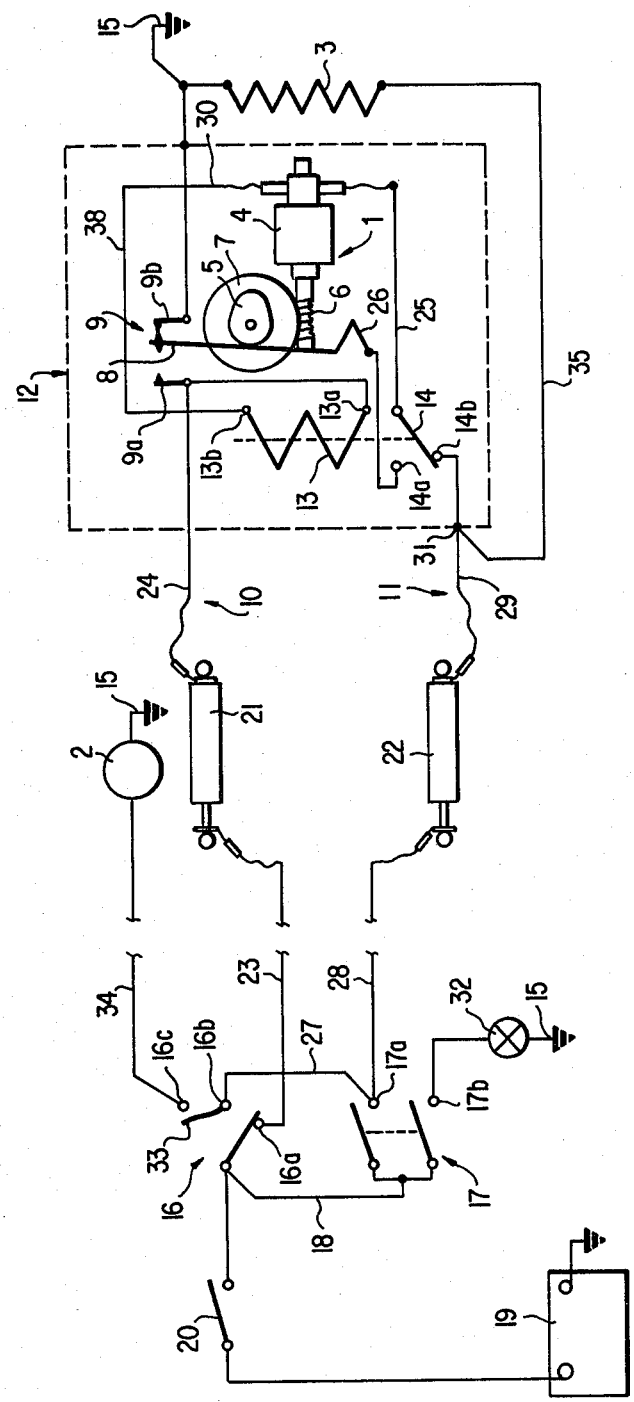
FIG. 1 is an electrical schematic of the wiper-washer-defogger arrangement of a first embodiment of the invention.

The preferred embodiment of the invention shown in FIG. 1 exhibits the three essential components of a complete arrangement for clearing the rear window of an automobile, namely: a wiper motor-reducer mechanism generally designated by the reference numeral 1 for actuating at least one wiper blade, not shown, an electric pump 2 the standard fluid circuit of which, not shown, terminates in nozzles directed at the window and an electrical heater resistance 3, possibly incorporated in the glass, for defogging the latter.

The shaft of the motor 4 of the wiper motor-reducer mechanism 1 drives a cam 5 thereof for prolonging operation to the end of the wiper action through the intermediary of a reducer formed by a worm 6 and a gear 7. The cam 5 acts, in an obvious manner, on the arm 8 of a reversing switch 9 intended to brake the motor 4 by short-circuiting the armature when the cam reaches a position corresponding to the end of the wiper sweep.

The motor-reducer assembly 1 can be completed with the prolongation arrangement constituting the object of the French application No. 75/15 319 in the name of the present applicant, according to which an auxiliary reducer permits prolonging the operation of the wiper for several back and forth motions from one control impulse.

According to the same application, one can also replace the cam 5 and reversing switch 9 with an equivalent arrangement with circular conducting and insulating tracks with sliding contacts.

According to the invention, the entire electric supply for the arrangement and the controls of the wiper motor 4 and defogger 3 comes from the front of the vehicle by way of two wires 10, 11 and a simple electrical circuit 12 comprising, besides the motor-reduced elements 4-7 and its associated reverser 9, a single relay 13 with a single relay arm 14. All the circuits are closed through the vehicle ground 15.

Commands are given by the momentary or permanent activation of two switches 16, 17 fed in parallel by line 18 from the vehicle battery 19 via the ignition or anti-theft switch 20. As will be seen in the description of operation, the possibilities offered by the diagram of FIG. 1 require the cooperation of the two following switches: a first three-position switch 16, the first position 16a of which is stable (that shown in contact with the arm) and the two others 16b, 16c are momentary, and a second switch 17 with two simultaneous stable contacts, the first 17a of which is electrically connected to the second position 16b of the first switch by a wire 27.

The supply and control by two wires 10, 11 permits satisfactory use of the conducting liftgate equilibrators 21, 22 for the electrical connections between the body and the liftgate equipped with the window-clearing arrangement. It suffices, then, to connect the wires to the ends of the two equilibrators 21, 22, thus facilitating installation and permitting rapid mounting on vehicles not equipped at the factory with the arrangement of the invention.

The circuit in FIG. 1 functions as follows:

At rest, switch 16 remains in its first position 16a, which is the off position for the wiper, while switch 17 is out of the circuit. When switch 20 is closed, current can flow in the first wire 10, passing in succession through the lead 23, the equilibrator 21, the lead 24 and the relay coil 13, the other end 13b of which is connected to ground by the lead 38. Under these conditions, the relay is excited and its relay arm 14 moves to a first position 14a, thus starting the wiper in motion by paralleling the armature of motor 4 with the relay coil 13 by way of the lead 25, the arm 14 of the relay, a thermal cutout 26 and the reverser 9 in its first position 9a tied to the relay coil terminal 13a.

When the wiper blade reaches the end of its sweep, the reverser 9 swings into its second position 9b (that shown), under the action of the cam 5, removing power from the motor armature and short circuiting it to stop it quickly.

During this sequence, and even after complete stoppage of the motor-reducer, the relay 13 remains excited but consumes negligible energy.

When an impulse wiper command is applied by placing the switch 16 in its second position 16b, which is momentary, the latter removes power from the first wire 10, thus releasing the relay 13 so that its reversing contact 14 moves to its second position 14b (that shown) and applies power to the second wire 11 and so to the motor armature by way of the leads 27, 28, the other liftgate equilibrator 22, the lead 29, the arm 14 of the unexcited relay and the leads 25, 30. A moment after the motor-reducer starts, the cam 5, integral with the output 7 of the reducer, quickly moves the reverser 9 for prolonged operation to its first position 9a. After this instant, the operator can release the switch 16 from its momentary position 16b so that it returns automatically to its first position 16a for stopping the wiper at the end of its operation. If it is desired to prolong the operation of the wiper, it is only necessary to hold the switch in its active position 16b. In practice, the operation, in spurts of arbitrary duration, is justified in the case of wiping a rear window since, usually, it is not necessary to keep the wiper going. The impulsive mode of operation permits, then, the simplification of the controls and the lightening of the demands on the wiring.

The activation of the wiper simultaneously turns on the defogger since the heater resistor 3 is in parallel with the winding of the motor 4 through the lead 35 coming off ahead of the relay arm 14 at the junction 31 with the second wire 11 in the region of lead 29. This untimely functioning of the defogger is no problem, given the brevity of the wiper action. In certain cases, the two simultaneous actions even prove to be desirable. This is notably the case whenever rain on the rear window is accompanied by the formation of condensation. This arrangement contributes, above all, to the simplification of powering the combination with two wires in accordance with the object of the invention.

In order not to distract the driver, a defogging indicator 32 is not lit when the wiper is activated.

The deliberate command for prolonged defogging results from activating the second switch 17, which applies power simultaneously through its two separate contacts 17a, 17b to the heater resistance 3 via the second wire 11 and to the defogging indicator 32. During this action, the motor-reducer 4 is not energized since, the first switch 16 being in its off position 16a, the relay 13 is excited and the motor armature short-circuited.

It should also be noted that when the driver places the switch 16 at second position 16b (unstable position) to provide actuatiion of the wiper, since first position 16a is no longer fed, relay coil 13 is not excited, and reversing contact 14 is at second position 14b. The motor is then fed by switch 20, second position 16b, leads 28 and 29, second position 14b and leads 25 and 30. Hence, cam 5 turns and places arm 8 at second position 9a. At this moment, the driver may release his action on second position 16b which automatically returns to first position 16a. At this point, relay 13 is fed by leads 23 and 24, relay coil 13 and lead 38, which takes reversing contact 14 to first position 14a. Since arm 8 is at first position 9a throughout nerely all of the cycle of cam 5, the motor 4 continues to be fed by lead 24, first position 9a, arm 8, first position 14a, and leads 25 and 30. Once the cam reaches the position shown in FIG. 1, arm 8 goes to second position 9b and stops the motor 4 by short-circuiting its secondary circuit (i.e. the circuit with lead 30, lead 25, first position 14a, arm 8, and first position 9b).

The third momentary position 16c of the first switch is used to activate the washer pump 2 by way of the lead 34.

This simultaneously starts the wiper since the switch 16 is designed to make a temporary connection between the second 16b and third 16c positions when it is turned to the latter. This feature is indicated schematically in FIG. 1 by the lead 33.

It should also be noted that second switch 17 set at contact 17a does not cause the windshield wiper motor to operate. In fact, since switch 16 remains at first position 16a, relay coil 13 is excited and reversing contact 14 remains at the first position 14a. At this moment, lead 29 feeds only the heater resistance 3 through the lead 35.

Figure 2:
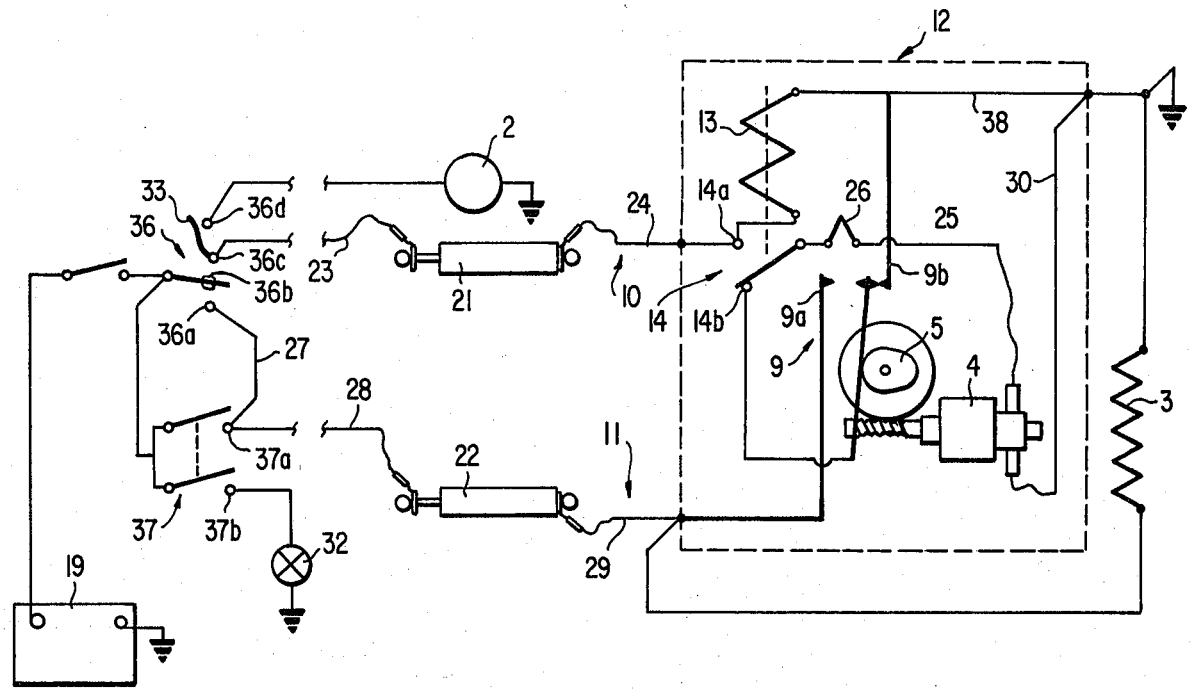
FIG. 2 is an electrical diagram of a second embodiment.

The embodiment shown in FIG. 2 differs in the modification of the electrical circuit 12 around the motor-reducer group 4, resulting in slightly different operation, and a modification of the first switch 36. This now has four positions, of which the first 36a (impulse stopping) and the fourth 36b (washing by energizing the pump) are momentary, while the second 36b (permanent stop) and the third 36c (permanent wiping) are stable.

In contrast to the circuit of FIG. 1, relay 13 is not excited in order to stop the motor 4, but to cause wiping. Further, the uses of the two wires 10, 11 are reversed, the first being used for permanent wiping and defogging and the second for impulse stopping and defogging.

In the permanent wiping position 36c, the coil 13 of the relay is energized by way of the lead 23, the liftgate equilibrator 21, the lead 24 and the ground return lead 38.

The arm 14 of the relay is then in its first position 14a, energizing the armature of the motor 4 through the thermal cutout 26 and leads 25, 30.

To stop the wiper, it is necessary to place switch 36 either in the stable stopping position 36b (in mid-wipe) or in the implulse stopping position 36a. In the first case, relay 13 is no longer energized, so that its arm returns to its second position 14b (that shown) and cuts off the motor without returning the wiper to its rest position. To do this, it is necessary to move the switch 36 to its position 36a for impulse stopping and hold it there long enough for the winding 4 to continue to be energized by the second wire 11, i.e. via the leads 27, 28, the other liftgate equilibrator 22, the lead 29, the reverser 9 for prolonging operation in its first position 9a and the relay arm 14. When the cam 5 on the reducer output gear suddenly swings the arm of the reversing switch 9 into its second position 9b (that shown), removing power from the winding 4 and short-circuiting it by grounding the terminal of the winding to which voltage was previously applied, the operator can then stop holding the switch in its first, momentary position 36a.

As can be seen, this arrangement is a little more demanding on the driver who must manipulate switch 36 twice in order to complete a cycle of wiping/return to rest position. Still it satisfies the aim of the invention. The washer and defogger operations are the same as in the first embodiment. Note that the impulse stopping control for prolonging operation simultaneously activates the defogger.

Figure 3:
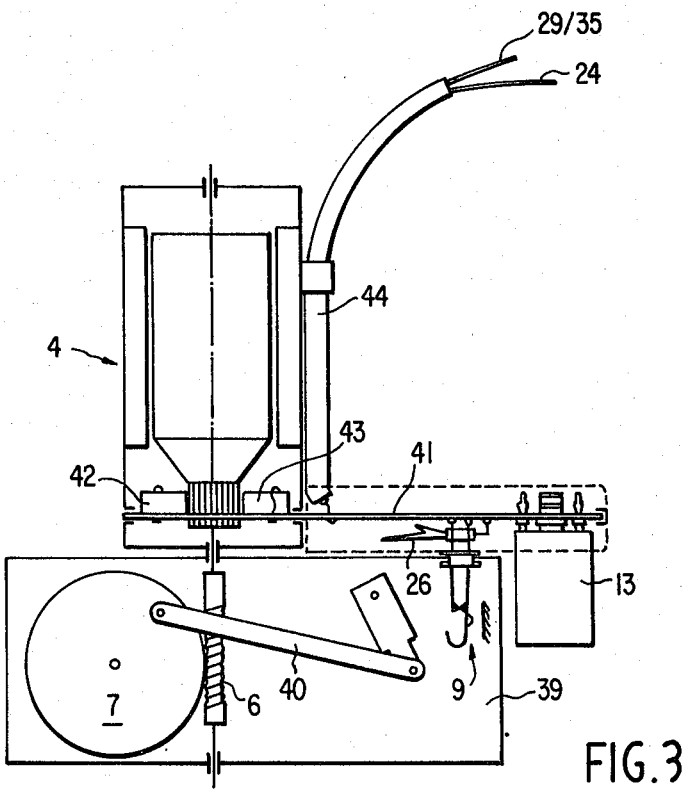
FIG. 3 shows a practical example of assembly of the arrangement in a compact form.

FIG. 3 shows a practical way of mounting the circuitry 12 enclosed in broken lines in FIGS. 1 and 2. This compact assembly, attached to the vehicle's liftgate, comprises the wiper motor 4, the reducer mounted on a housing 39 and consisting of the worm 6, gear 7 and linkage 40 for driving the wiper, together with a plate 41 holding the motor brushes 42, 43, the reverser 9 for prolonging operation, the plug-in relay 13 and the thermal cutout 26. The plate 41 also serves to support a printed circuit comprising the electrical connections among the components within the boundary 12.

The cable 44 carries the two wires 24, 29 for powering and controlling the arrangement intended to be connected to the liftgate equilibrators 21, 22, one of the wires 29 being common with the supply lead 35 for the heater resistance 3 of the rear window.

Many variations of the described embodiments are obviously possible without going beyond the bounds of the invention. Thus, in particular, one could conceive of other two-wire operating sequences, with a single relay, derived from those above and based on momentary or permanent actions of one or more switches with different numbers of positions.

Likewise, it is possible to replace the printed circuit with traditional wiring among the components mounted on the motor-reducer housing.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A window-clearing arrangement particularly for the rear window mounted on a vehicle liftgate attached to a body of a vehicle, which comprises:
   a wiper motor-reducer assembly, said assembly including a motor, said assembly being located on said vehicle liftgate;
   an electric heater window-defogger system, said defogger system being located on said vehicle liftgate;
   means for supplying electrical power to said wiper motor-reducer and to said defogger system, said means being located on the body of said vehicle;
   first and second conductor means and a vehicle ground coupling said means for supplying electrical power with said wiper motor-reducer assembly, said defogger system being coupled to said second conductor means;
   electric circuit means coupling said wiper motor-reducer assembly to said first and said second conductor means, said circuit means including a relay having a movable relay arm, said motor being coupled between said relay arm and said vehicle ground, said circuit means further including a reversing switch having a movable reversing switch contact coupled to a fixed contact of said relay; and
   means for prolonging the operation of said motor until said motor is stopped in its rest position, said prolonging means including a mechanical means coupling the mechanical output of said motor to said movable reversing switch contact for controlling the position of said reversing switch contact;
   wherein said motor is selectively coupled to one of said first and said second conductor means by said relay and said reversing switch during the operation of said motor;
   wherein said motor is short-circuited by said relay and said reversing switch when said motor is stopped in its rest position; and
   wherein the complete electrical powering and control for completely and independently controlling wiping by said wiper motor-reducer assembly and defogging by said defogger system are realized solely through the electrical interconnection of said means for supplying electric power with said wiper motor-reducer assembly and said defogger system by said first and second conductor means and by said vehicle ground, said first and second conductor means and said vehicle ground passing through a junction between said vehicle liftgate and the body of said vehicle.

2. A window-clearing arrangement particularly for the rear window mounted on a vehicle liftgate attached to a body of a vehicle, which comprises:

a wiper motor-reducer assembly, said assembly including a motor, said assembly being located on said vehicle liftgate;

an electric heater window-defogger system said defogger system being located on said vehicle liftgate;

means for supplying electrical power to said wiper motor-reducer and to said defogger system, said means being located on the body of said vehicle;

first and second conductor means and a vehicle ground coupling said means for supplying electrical power with said wiper motor-reducer assembly, said defogger system being coupled to said second conductor means;

electric circuit means coupling said wiper motor-reducer assembly to said first and said second conductor means, said circuit means including a relay having a movable relay arm, said motor being coupled between said relay arm and said vehicle ground, said circuit means further including a reversing switch having a movable switch contact coupled to a fixed contact of said relay; and means for prolonging the operation of said motor until said motor is stopped in its rest position, said prolonging means including a mechanical means coupling the mechanical output of said motor to said movable reversing switch contact for controlling the position of said reversing switch contact;

wherein said motor is selectively coupled to one of said first and said second conductor means by said relay and said reversing switch during the operation of said motor;

wherein said motor is short-circuited by said relay and said reversing switch when said motor is stopped in its rest position;

wherein said means for supplying electrical power includes first switch means for controlling the operation of said wiper motor-reducer assembly and second switch means for controlling the operation of said defogger system, said first and second switch means being coupled to said first and second conductor means, each of said first and second switch means including a plurality of contacts, at least one of said plurality of contacts of said second switch means being coupled to one of said plurality of contacts of said first switch means; and wherein the complete electrical powering and control for completely and independently controlling wiping by said wiper motor-reducer assembly and defogging by said defogger system are realized solely through the electrical interconnection of said means for supplying electric power with said wiper motor-reducer assembly and said defogger system by said first and second conductor means and by said vehicle ground, said first and second conductor means and said vehicle ground passing through a junction between said vehicle liftgate and the body of said vehicle.

3. A window-clearing arrangement as recited in claim 1 which further comprises:

washer pump means for spraying a liquid on said rear window of said liftgate, said pump means being located on the body of said vehicle, said pump means being coupled to said means for supplying electric power; and indicator means for indicating the operational state of said defogger system, said indicator means being coupled to said means for supplying electric power.

4. A window-clearing arrangement as recited in claim 1, wherein:

said first conductor means includes a first liftgate equilibrator; and said second conductor means includes a second liftgate equilibrator;

wherein said first and said second equilibrators are electrically conductive, said first and said second equilibrators being positioned at said junction between said vehicle liftgate and said body of said vehicle.

5. A window-clearing arrangement as recited in claim 3, wherein:

said relay further includes first and second fixed relay contacts and a relay coil, said relay coil being coupled between said first conductor means and said vehicle ground, said first fixed relay contact being coupled to said movable contact of said reversing switch, said second fixed relay contact being coupled to said second conductor means, said movable relay arm contacting said first fixed relay contact when said relay coil is energized and contacting said second fixed relay contact when said relay coil is de-energized; and said reversing switch further includes first and second fixed reversing switch contacts, said first fixed reversing switch contact being coupled to said first conductor means, said second fixed reversing switch contact being coupled to said vehicle ground, said movable contact of said reversing switch contacting said second fixed reversing switch contact when said motor is stopped in its rest position, said movable contact of said reversing switch contacting said first fixed reversing switch contact when said motor is positioned away from said rest position.

6. A window-clearing arrangement as recited in claim 5, wherein said means for supplying electric power comprises:

first switch means for controlling the operation of said wiper motor-reducer assembly, said first switch means including a first switch having three switch positions; and second switch means for controlling the operation of said defogger system, said second switch means including a second switch having two switch positions;

wherein said first switch includes a first movable switch arm and first, second, and third fixed contacts, said first movable switch arm being coupled to a source of electric power, said first fixed contact being coupled to said first conductor means, said second fixed contact being coupled to said second conductor means, said third fixed contact being coupled to said washer pump means, said first movable switch arm contacting said first fixed contact when said first switch is in a first position, said first movable switch arm contacting said second fixed contact when said first switch is in a second position, said first movable switch arm contacting said second and third fixed contacts when said first switch is in a third position;

wherein said second switch includes second and third movable switch arms and fourth and fifth fixed contacts, said second and third movable switch arms being coupled to said source of electric power, said fourth fixed contact being coupled to said second conductor, said fifth fixed contact being coupled to said indicator means, said second switch arm contacting said fourth fixed contact and said third switch arm contacting said fifth fixed contact when said second switch is in a first position, said second and third switch arms being positioned away from said fourth and fifth contacts when said second switch is positioned in a second position.

7. A window-clearing arrangement as recited in claim 6, wherein:
said second and third positions of said first switch are momentary contact positions.

8. A window-clearing arrangement as recited in claim 3, wherein:
said relay further includes first and second fixed relay contacts and a relay coil, said relay coil being coupled between said first conductor means and said vehicle ground, said first fixed relay contact being coupled to said first conductor means, said second fixed relay contact being coupled to said movable contact of said reversing switch, said movable relay arm contacting said first fixed relay contact when said relay coil is energized and contacting said second fixed relay contact when said relay coil is de-energized; and
said reversing switch further includes first and second fixed reversing switch contacts, said first fixed reversing switch contact being coupled to said second conductor means, said second fixed reversing switch contact being coupled to said vehicle ground, said movable contact of said reversing switch contacting said second fixed reversing switch contact when said motor is stopped in its rest position, said movable contact of said reversing switch contacting said first fixed reversing switch contact when said motor is positioned away from said rest position.

9. A window-clearing arrangement as recited in claim 8, wherein said means for supplying electric power comprises:

first switch means for controlling the operation of said wiper motor-reducer assembly, said first switch means including a first switch having four positions; and
second switch means for controlling the operation of said defogger system, said second switch means including a second switch having two positions;
wherein said first switch includes a first movable switch arm and first, second, third, and fourth fixed contacts, said first movable switch arm being coupled to a source of electric power, said first fixed contact being coupled to said second conductor means, said third fixed contact being coupled to said first conductor means, said fourth fixed contact being coupled to said washer pump means, said first movable switch arm contacting said first fixed contact when said first switch is in a first position, said first movable switch arm contacting said second fixed contact when said first switch is in a second position, said first movable switch arm contacting said third fixed contact when said first switch is in a third position, said first movable switch arm contacting said third and fourth fixed contacts when said first switch is in a fourth position;
wherein said second switch includes second and third movable switch arms and fifth and sixth fixed contacts, said second and third movable switch arms being coupled to said source of electric power, said fifth fixed contact being coupled to said second conductor, said sixth fixed contact being coupled to said indicator means, said second switch arm contacting said fifth fixed contact and said third switch arm contacting said sixth fixed contact when said second switch is in a first position, said second and third switch arms being positioned away from said fifth and sixth contacts when said second switch is positioned in a second position.

10. A window-clearing arrangement as recited in claim 9, wherein:
said first and fourth positions of said first switch are momentary contact positions.

* * * * *